(12) United States Patent
Pinglikar et al.

(10) Patent No.: US 12,093,568 B1
(45) Date of Patent: Sep. 17, 2024

(54) SEGREGATED FILESYSTEM METADATA OPERATIONS USING BUFFERED ATOMIC WRITE INTERFACE

(71) Applicant: Seagate Technology LLC, Fremont, CA (US)

(72) Inventors: Vidyadhar Charudatt Pinglikar, Pune (IN); Shankar Tukaram More, Pune (IN)

(73) Assignee: Seagate Technology LLC, Fremont, CA (US)

( * ) Notice: Subject to any disclaimer, the term of this patent is extended or adjusted under 35 U.S.C. 154(b) by 156 days.

(21) Appl. No.: 17/726,337

(22) Filed: Apr. 21, 2022

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0656* (2013.01); *G06F 3/0679* (2013.01)

(58) Field of Classification Search
CPC ...... G06F 3/0659; G06F 3/0604; G06F 3/064; G06F 3/0656; G06F 3/0679
USPC ........................................................ 711/154
See application file for complete search history.

(56) References Cited

U.S. PATENT DOCUMENTS

| | | | |
|---|---|---|---|
| 9,170,938 B1 * | 10/2015 | Walsh .................. | G06F 3/0619 |
| 10,013,354 B2 | 7/2018 | Flynn et al. | |
| 10,545,927 B2 | 1/2020 | Strauss et al. | |
| 10,951,705 B1 | 3/2021 | Desai et al. | |
| 2008/0250199 A1 * | 10/2008 | Lubbers ................ | H04L 67/561 |
| | | | 711/E12.019 |
| 2012/0254120 A1 * | 10/2012 | Fang .................... | G06F 16/2379 |
| | | | 707/648 |
| 2013/0166820 A1 * | 6/2013 | Batwara .............. | G06F 12/0246 |
| | | | 711/E12.008 |
| 2016/0048354 A1 * | 2/2016 | Walsh .................. | G06F 3/0688 |
| | | | 711/206 |
| 2021/0026837 A1 * | 1/2021 | Talagala .............. | G06F 16/2365 |
| 2022/0206713 A1 * | 6/2022 | Kim ........................ | G06F 12/10 |
| 2022/0206715 A1 * | 6/2022 | Kim ....................... | G06F 3/0656 |

* cited by examiner

*Primary Examiner* — Titus Wong
(74) *Attorney, Agent, or Firm* — Mueting Raasch Group

(57) ABSTRACT

A storage command is received that is directed to a distributed storage system. Based on the storage command, a metadata update is targeted to a logical block address of metadata storage of the distributed storage system. The metadata update includes a chunk of metadata that is smaller than a block addressed by the logical block address. An atomic write command is sent to a block device interface. The command includes the chunk of metadata, the logical block address, and an offset within the block defining where the chunk of metadata is to be stored. Via the block device interface, the atomic write command is stored in a non-volatile buffer that has faster performance than the metadata storage. The chunk of metadata of the atomic write command is written from the non-volatile buffer to the block in the metadata storage via a background process using an atomic read-modify-write command.

20 Claims, 6 Drawing Sheets

SEGREGATED FILESYSTEM METADATA OPERATIONS USING BUFFERED ATOMIC WRITE INTERFACE

SUMMARY

The present disclosure is directed to a system and method using segregated filesystem metadata operations using a buffered atomic write interface. In one embodiment, a storage command is received that is directed to a distributed storage system. Based on the storage command, a metadata update is targeted to a logical block address of metadata storage of the distributed storage system. The metadata update includes a chunk of metadata that is smaller than a block addressed by the logical block address. An atomic write command is sent to a block device interface. The command includes the chunk of metadata, the logical block address, and an offset within the block defining where the chunk of metadata is to be stored. Via the block device interface, the atomic write command is stored in a non-volatile buffer that has faster performance than the metadata storage. The chunk of metadata of the atomic write command is written from the non-volatile buffer to the block in the metadata storage via a background process using an atomic read-modify-write command.

In another embodiment, one or more storage commands are received that are directed to a distributed storage system. Based on the one or more storage commands, chunks of metadata are determined in a metadata storage unit that are to be updated as part of the one or more storage commands. The chunks of metadata are each smaller than a block size of the metadata storage unit, and the metadata storage unit is separate from a content storage unit. The chunks of metadata are discontinuously scattered across the metadata storage unit. An atomic write command is sent to a block device interface. The command includes the following data: the chunks of metadata, respective logical block addresses and offsets associated with the chunks of metadata. The offsets define where the chunks of metadata are to be stored in the respective logical block addresses. Via the block device interface, the data of the atomic write command is stored in a non-volatile buffer that has faster performance than the metadata storage. The chunks of metadata of the atomic write command are written from the non-volatile buffer to respective blocks in metadata storage unit via a background process using atomic read-modify-write commands.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
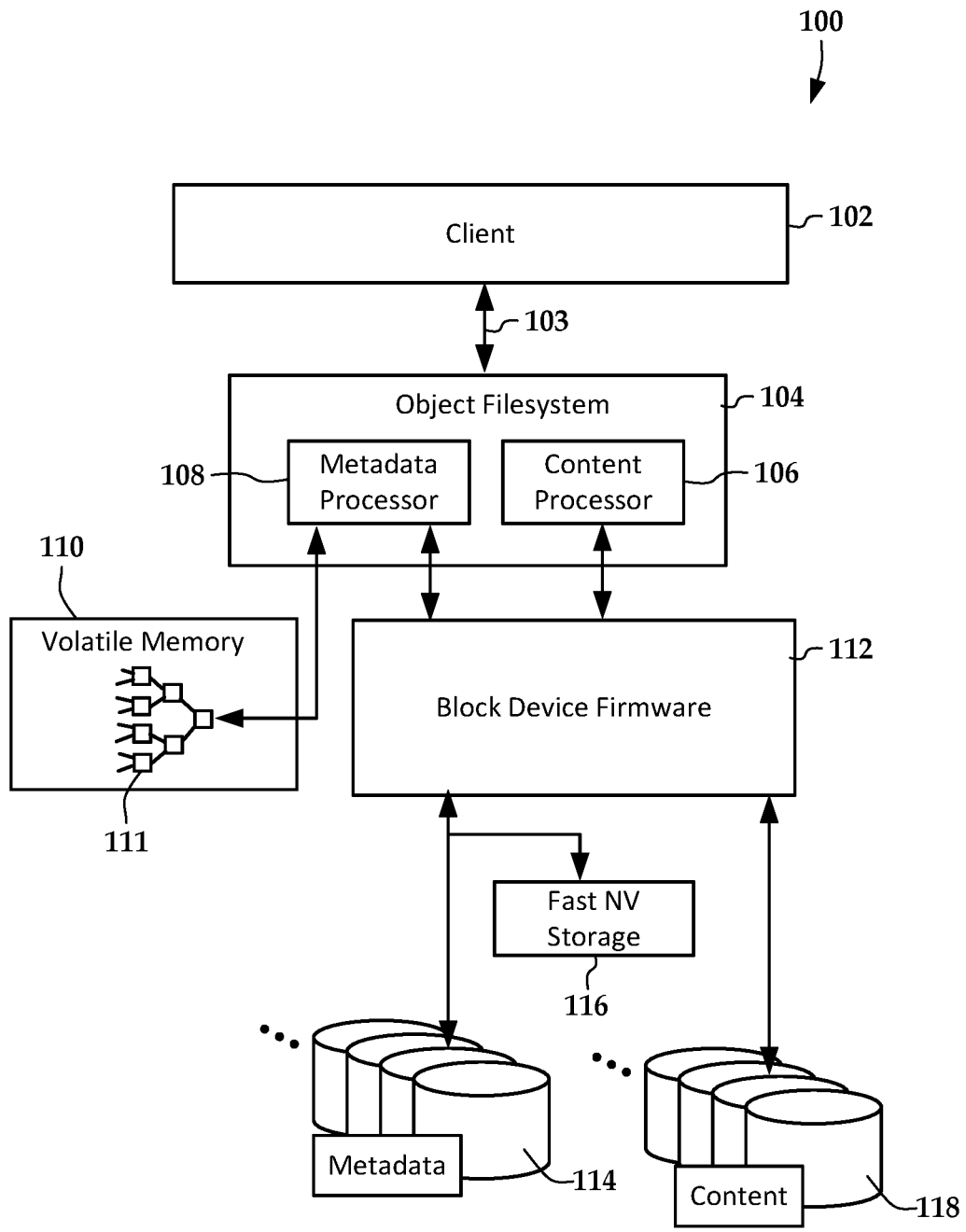
FIG. 1 is a diagram showing an object storage system according to an example embodiment.

The present disclosure is generally related to distributed storage. Distributed storage involves duplicating data across multiple storage nodes, both for purposes of reliability/availability and to increase performance. As an example of the latter, different duplicate storage nodes can be selected to service a storage request (e.g., reading of data from storage and writing data to storage) in order to balance loads among the nodes. As will be described in detail below, these distributed storage systems may be configured as object-based storage.

Storage devices have traditionally used a combination of block-based storage and filesystems, in which data structures (e.g., metadata, files, directories) of the filesystems are mapped to locations (e.g., block/sector addresses) on the device. A traditional filesystem typically uses a fixed metadata structure that is stored on a data storage device (e.g., hard disk drive, solid state drive, RAID subsystems, optical storage) together with the associated data files. At least some of these data structures are located at predetermined addresses so that a host computer can easily find a root of the filesystem, which enables traversing the entire file system hierarchy. For directories, the metadata may include block addresses of various files and subdirectories stored on the directory. For individual files, this metadata may include a location of the start of the file and a size of the file. For both files and directories, the metadata may also include a name of the file/directory, timestamps of created, edited, etc., flags for read/write permissions, etc.

In a traditional filesystem, the drive itself has no knowledge of whether a particular block address is being used to store data, metadata, etc. All of the metadata is maintained by the host, e.g., the computer that is attached to the drive. The drive treats all data equally, although may perform some data analysis, such as tracking read and write activity for the purposes of caching so that more commonly used data can be accessed in a faster tier of local storage.

Traditional filesystems and block storage are effective for many uses. For example, the hierarchy of a filesystem is easily represented in a user interface as collections of folders and files. In such a case, when a user selects a file to edit it, it is straightforward to map the filesystem path of the selected file to a starting block address of the file, and then load at least part of the file into random access memory for the use of an editor program. In other cases, traditional filesystems are not so efficient. For example, in files that are accessed in a large-scale storage system (e.g., clustered storage), namespace collisions of individual files may occur amongst the many different filesystems that are accessible on the storage system.

In order to address these issues of traditional filesystems, the concept of object storage has been introduced. Object storage removes some of the lower-level details of storage (e.g., mapping of data to block addresses, storage of metadata) from the end-users of the data, e.g., operating systems, applications, systems administrators. The storage controller and/or drive instead manages these low level details of the user data and metadata. The data abstracted to the end users as objects with unique identifiers, referred to herein as keys. The key is used for access operations such as read, write, modify, append, etc., and is also associated with the object metadata. Because object storage drives (or storage subsystems) have an understanding of particular objects that the devices are storing, the drives can make decisions about how to store the data to optimize aspects such as access times, search and indexing, reliability, recoverability, etc. All of this can be made invisible to the end users, who only need to know the keys that are associated with an object for retrieval, storage, and modification.

An object-based storage system may be able to provide other functionality not provided by conventional storage systems. For example, such a system may be able to accept queries about the object data. The storage system can receive and process queries on object metadata, and in response return keys of objects that satisfy the query. This provides flexibility for the end user, in that content-related searches can be made to find classes of objects, as well as being able to access individual objects using the key.

In FIG. 1, a diagram shows a simplified view of a distributed storage system 100 according to an example embodiment. A client 102 makes storage requests 103 via an object filesystem interface 104. The object filesystem interface 104 may store and retrieve objects based on a globally unique identifier instead of a block address used by conventional filesystems. The object filesystem interface 104 processes the content (also referred to as the object data) separately from the metadata via respective content processor 106 and metadata processor 108. Ultimately, the content and metadata will be stored in separate storage units 118, 114 as described below, however will be handled differently to enhance performance of the system 100.

The content processor 106 deals with data objects that may be analogous to traditional files, e.g., one or more blocks of data that are concatenated to form a piece of digital content such as media, documents, etc. Typically, the content is significantly larger than the metadata, so the content storage unit 118 may be optimized to handle larger data with a focus on sequential access, although content may be subject to random access requests as well. In contrast, the metadata processor 108 will be dealing with smaller chunks of data, and those chunks are more likely to be randomly accessed. Thus, while the metadata storage unit 114 may ultimately use similar storage devices (e.g., hard disk drives) as the content storage unit 118 for long-term storage, the metadata processor 108 may utilize other storage, including a volatile memory 110 and fast non-volatile (NV) storage 116 to better handle these characteristics of metadata. The NV storage 116 may include capacitor-backed, dynamic random-access memory (DRAM), magnetoresistive random-access memory (MRAM), static random-access memory (SRAM), etc.

For example, the metadata processor 108 may maintain a data structure 111 in volatile memory 110 that is searchable for fast lookups of the metadata itself and/or references to where the data (content) and metadata is stored in the metadata storage unit 114. In one embodiment, this structure includes a combination of linked lists and binary trees (B-trees). This can speed up operations such as searches. As will be described in greater detail below, the fast NV storage 116 can be used as a buffer to temporarily store metadata before it is written to the metadata storage unit 114.

A block device firmware interface 112 is an apparatus that manages access to the various persistent storage units 114, 116, 118. The object filesystem 104 communicates storage requests with the block device firmware interface 112 using logical block addresses (LBAs) in the object address space and metadata address space, and those LBAs may be virtualized, e.g., different than the LBAs used by the devices of the physical storage units 114, 118.

Because the metadata includes small, randomly updated chunks of data, the write and update operations will be scattered over the LBA space. In other words, the target LBAs may be discontinuously located anywhere and the data size will often be less than the block size. For example, if a time that an object was last modified or last accessed is tracked in the metadata, these time values (which each may be just 8 bytes of data in one example) will be regularly updated over the entire metadata LBA space. Also note that because the data storage units are distributed, the metadata chunks may need to be duplicated atomically over multiple disk volumes.

Scattered object metadata operations (related with each other) across different discs for a given transaction need to be consistent in the event of an ungraceful shutdown/restart. This can happen upon unexpected power loss, or in response to serious system faults (e.g., kernel panic). Current systems use logging or journaling to ensure consistency of metadata transactions. Logging or journaling involves recording the changes the filesystem will make before the changes are made, usually in special region of storage (the journal). After an ungraceful shutdown and restart, recovery involves reading the journal and applying the changes in order. For a distributed file system, the journal may reside in a separate region of persistent storage, and metadata updates first journaled in this other region before being applied to the target region. The use of metadata journaling impacts filesystem performance due to additional overhead of transaction logging, as well as increasing complexity of system.

Persistent memory devices are mainly block devices, where data is stored and retrieved in unit of block size, e.g., 512 bytes, 4 Kbytes. However, the metadata operations may only update few bytes in different blocks (referenced by their LBA) distributed across drives. The operations performed on the drives (e.g., read-modify-write) to perform the metadata updates will be atomic in order for to recovery schemes to work. The operations such as read-modify-write are used because the updates are normally not sector-size aligned, and so the original sector data is first read (e.g., into a buffer), the updated values are inserted into the buffer to overwrite part of the sector data, and then the updated buffer with new and old sections is written over the old sector.

In embodiments described below, the block device firmware interface 112 includes features that assist in metadata storage that is recoverable upon ungraceful shutdown but does not require journaling. The block device firmware interface 112 provides atomic write support for scattered metadata chunks, e.g., it will perform atomic read-modify-write for all the metadata chunks in the scattered list.

Figure 2:
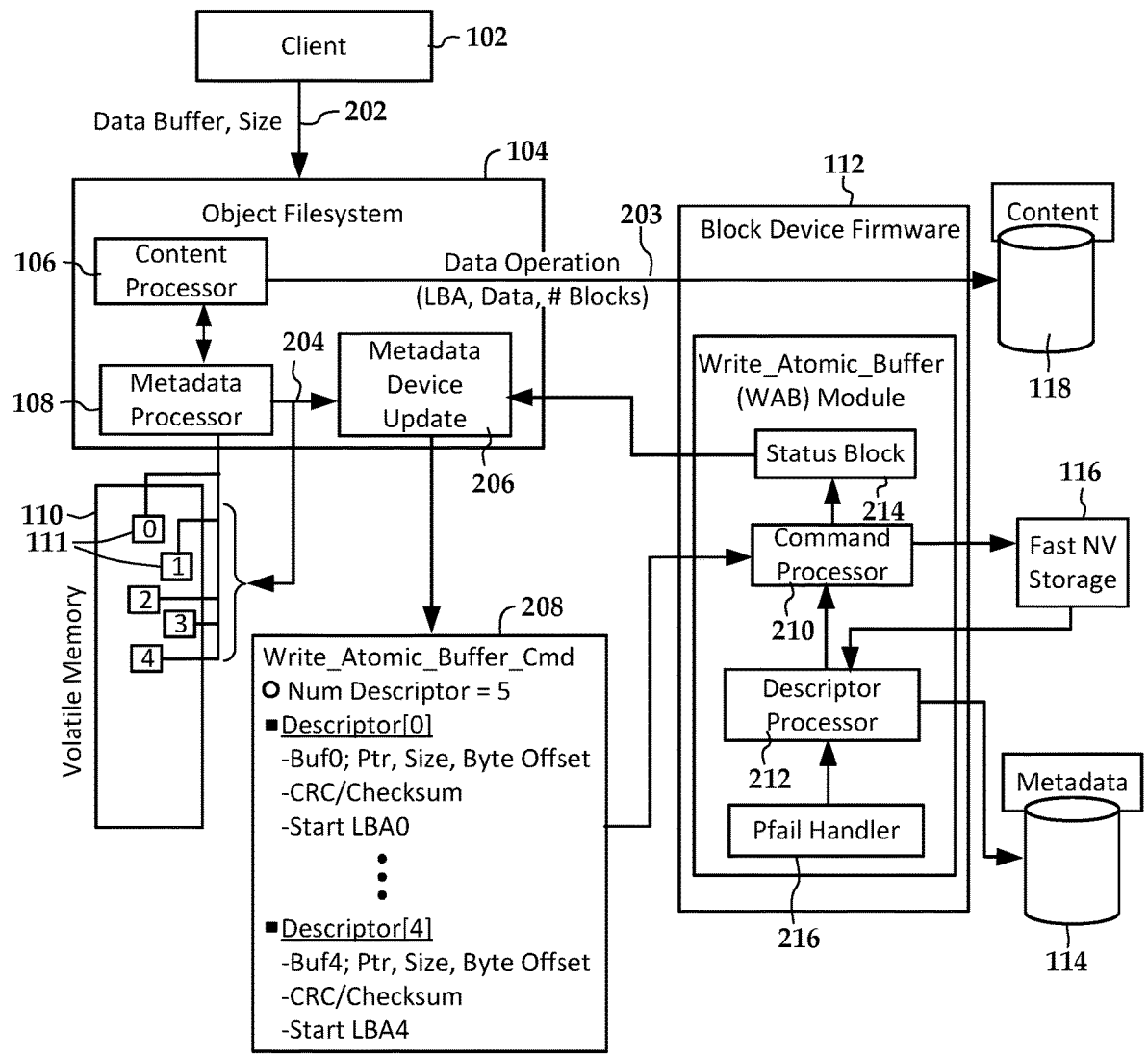
FIG. 2 is a diagram showing a metadata operation being performed in a storage system according to an example embodiment.

In reference now to FIG. 2, a block diagram shows examples of metadata updates according to an example embodiment. A filesystem operation 202 is received at the object filesystem 104. The filesystem operation 202 may involve writing a data/object to storage, which will also involve inserting or updating metadata in storage. In some cases, the operation may include another operation that still involves a metadata update, such as a read that results in an access time being updated. In either case, both the content processor 106 and the metadata processor 108 will perform actions in response to the metadata updates initiated by the filesystem operation 202. The content processor 106 generally writes 203 the object data to the content storage unit 118, and the details of the object write 203 have no significant bearing on the metadata operations performed by the metadata processor 108.

The metadata operations performed by the metadata processor 108 include operations 204 to update existing structures like B-trees, linked-lists. These update operations 204 may be done in volatile memory 110 first and then made persistent by using the operating system device driver via the block device firmware interface 112. In the figure, the persistence of the metadata is handed by a metadata device update component 206.

The metadata device update component 206 makes metadata storage operations persistent using the Write Atomic Buffer (WAB) command 208. The metadata device update component 206 will fill one or more buffers which include the data and other details of the metadata to be written to the data storage device. The particulars of the WAB command 208 will be described in greater detail further below. The WAB command 208 is sent to a command processor 210 of the block device firmware interface 112.

The block device firmware interface 112 device will attempt to allocate space in NV storage 116 for the saving all the info of the WAB command 208 needed for later background processing. This will help to further speedup the metadata operations. If space in NV storage 116 is not available, the WAB command 208 can wait in a queue (e.g., resource wait queue). Once NV space is available, the WAB command 208 will get processed. A descriptor processor 212 of the device firmware will then process the WAB command 208, e.g., checking validity of the command, and returns success via status block 214. All information in the WAB command 208 that is needed for background processing will be saved as a buffer in the NV storage 116, where it is eventually written to the metadata storage unit 114 (e.g., using an atomic read-modify-write) by a background process. Once buffers are processed the space in NV storage 116 used by the buffers. can be freed.

Multiple sub-sector size buffers can be updated (made persistent) using a single WAB command 208, improving metadata operation efficiency. As seen in the figure, the WAB command 208 may have the parameter (Num Descriptor) that indicates the number of buffer descriptors or element in scatter gather list. This is followed by an array of descriptors (Descriptor[0]-Descriptor[4]). Each descriptor includes a set of parameters that describe individual buffers (Buf0-Buf4). Those parameters include a pointer (Ptr) to the buffer, which is a location in local or shared memory where the buffer data is stored. Other buffer parameters include a size of the buffer (which can be more than the block/sector size) and a byte offset, which represents an offset with respect to the LBA of a block/sector in which the buffer is to be written.

Each descriptor includes error detection or correction value (CRC/Checksum) which can be used to validate the data buffer. In some cases, the error detection or correction value may include just validation data, e.g., a basic checksum, that indicates an error in the data buffer but does not allow for correction. In this case, an error would be returned upon failure to validate the value against the buffer. In other cases, the error detection or correction value may include data that allows correcting some errors (e.g., n-bit errors) such as provided by a cyclic redundancy check (CRC). In this case, an error would be returned if error could not be corrected using the data correction algorithm associated with the correction value. Also in each descriptor is the start LBA of the metadata storage unit 114 into which the buffer is to be written. This may be a virtual LBA space provided by the block device firmware interface 112 and may be different than the LBA of the device where the buffer is ultimately stored, e.g., an LBA of a particular hard disk sector. At the top of FIGS. 3 and 4, schematic diagrams show the buffers Buf0-Buf4 and LBAs LBA0-LBA4 from the example WAB command 208 in FIG. 2.

In reference again to FIG. 2, upon receiving the WAB command 208, the command processor 210 of the block device firmware interface 112 will validate the command, e.g., check that identified number of descriptors are properly received, validate integrity of each buffer by, e.g., recomputing CRC/checksum and comparing against received checksum, etc. Once the WAB command 208 is validated, the descriptor and buffer data will be saved in fast NV storage space 116 and success will be returned to the requestor, e.g., client 102. While the description below may refer to this storage operation as saving the WAB command 208, the actual format of data stored in the NV storage 116 need not have the same structure or data as the WAB command. For example, the firmware may change the Ptr value in the WAB command after storing it in the NV storage 116 to correspond to a pointer of the NV storage address space. The WAB command 208 will be held in NV storage space 116 until it can be written in the metadata storage unit 114. Saving the descriptor and returning success will avoid latency in processing these commands.

Descriptor processing can be done in the background via the descriptor processor 212. The command processor 210 can further choose to put a lock on the LBA set that is the target of a buffered WAB command 208. In this way, any new writes/reads to the same LBA can be trapped and handled efficiently, e.g., merging the buffer data so that multiple updates can be done with a single read-modify-write command at the target storage device. This also allows any read requests from the host/client 102 at an affected LBA to be updated from the NV storage 116 prior to the read data being returned to the client 102.

Figure 3:
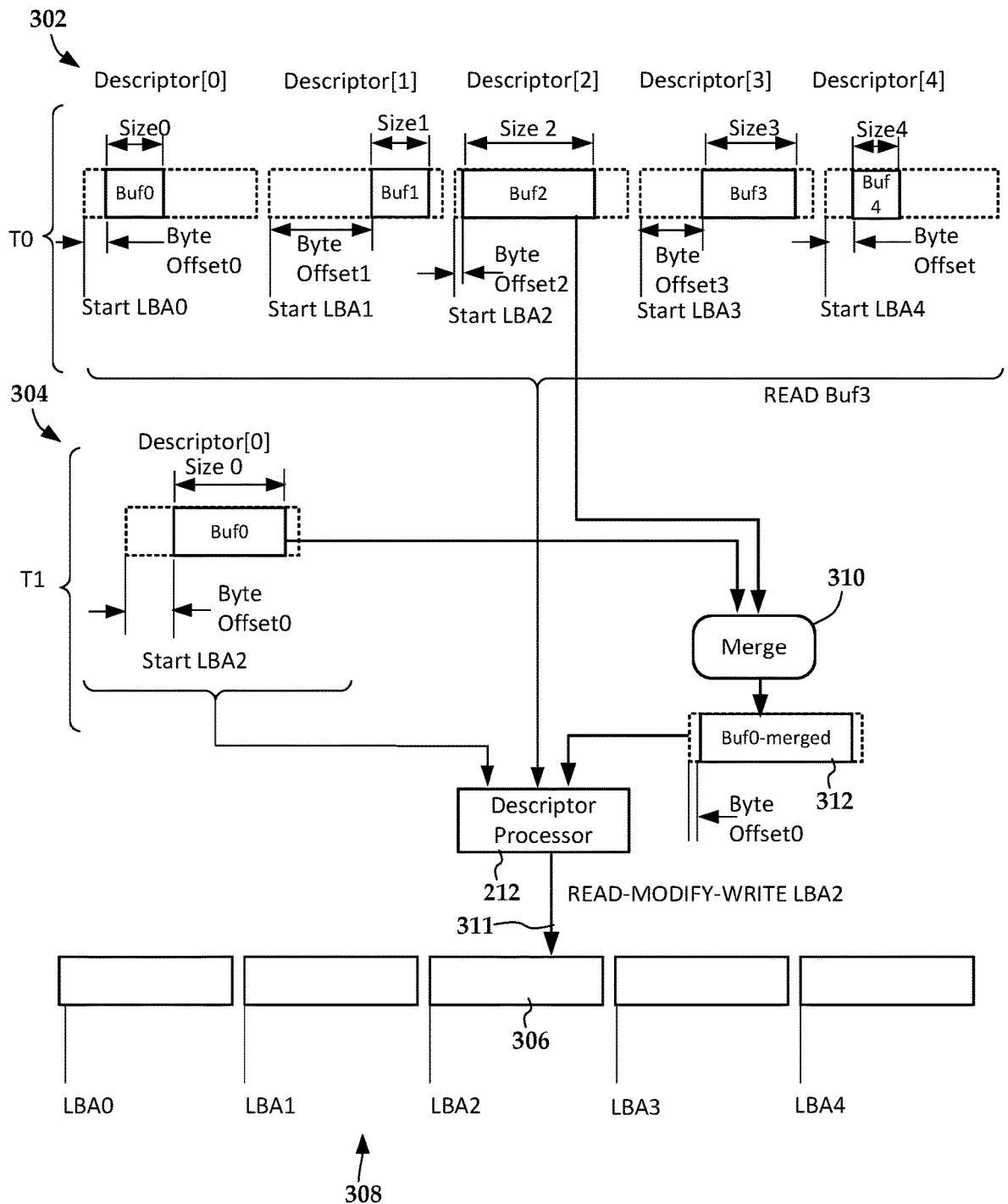
FIG. 3 is a diagram showing merging of buffered write requests according to an example embodiment.

In FIG. 3, a diagram shows an example of how this merging can occur with two WAB commands in the NV storage 116. At time T0, a first WAB command 302 is stored in fast NV storage 116, which includes five buffers as in the previously illustrated example. A lock is placed on the LBAs of this WAB command 302, namely LBA0-LBA4. At time T1, a subsequent, second WAB command 304 is stored, the second WAB command 304 having a single buffer that is targeted for LBA2. Due to the previous lock on LBA2 from preceding WAB command 302, the descriptor processor 212 will perform a merge 310 before or during the writing 311 of the block 306 in the storage device 308. After the writing 311 is done, the lock is removed.

Because the merged buffer 312 does not completely fill the block at target LBA2, the writing 311 is shown as a read-modify-write. Because the merged buffers overlap, the order of the merge 310 will take into account the order received of the WAB commands 302, 304 so that newer data overwrites older data.

In reference again to FIG. 2, while operating as a background process, the descriptor processor 212 can issue parallel read from the metadata storage unit 114 for some or all the LBA's of descriptors within WAB commands 208 buffered in NV storage 116 and will wait for completion of the reads. Upon read completion, read buffers will be merged with received descriptor-buffers and write will be issued, causing the merged read buffers to be written back to the metadata storage unit 114. Upon write completion, the descriptor entry will be removed from NV storage 116.

In case of power failure, the NV storage 116 will save the unprocessed descriptor list and its buffer. This may be managed by the power fail handler component 216. Locks/overlap-tags on the descriptor LBAs still in NV storage 116 can be added as part of power on processing, to trap any reads/writes on the descriptor LBAs, and the remaining descriptor can be processed. These traps allow the read/write operation to check if any incoming host read/write LBAs are overlapping with descriptor LBA from an unprocessed WAB command 208.

In case of overlap, data read from the metadata storage unit 114 will be merged with subsector buffer at correct offset, and the merged data will be sent to the host/client 102. The descriptor processor 212 can hold this merged buffer and can be used for optimizing its read-modify-write. For example, the merged buffer may be inserted into the NV storage 116 and used to just rewrite and entire block/sector, assuming no further changes to the LBA are inserted, e.g., vi a new WAB command 208 received during descriptor processing.

Figure 4:
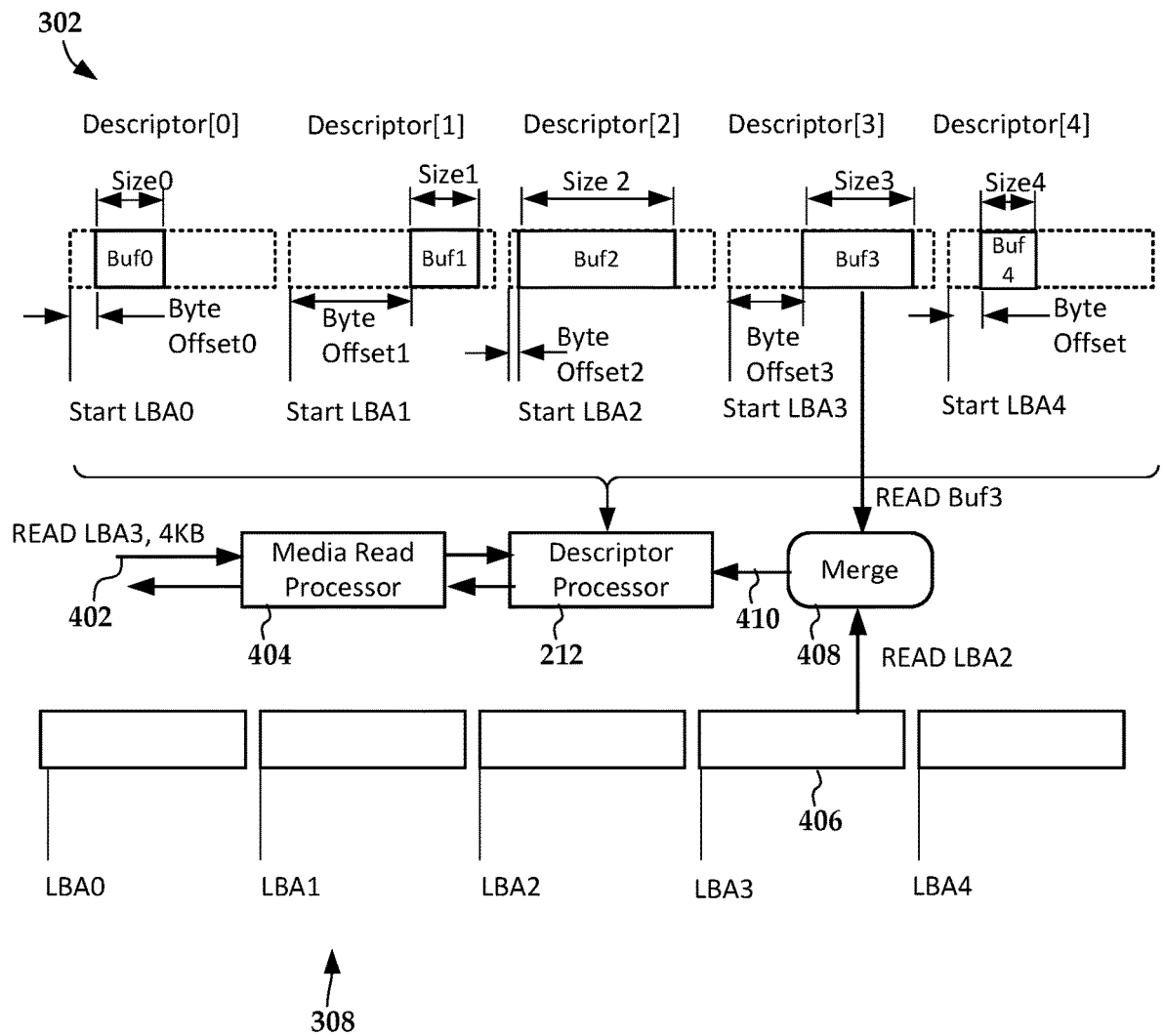
FIG. 4 is a diagram showing merging of a buffered write request with a read request according to an example embodiment.

In FIG. 4, a diagram shows how a data read is handled before a WAB command 302 is processed, which could occur during regular operation or after a recovery. The WAB command 302 is still saved in the NV storage 116 when a read request 402 comes in to a media read processor 404 to read the contents of LBA3. The descriptor processor 212 will have a trap on LBA0-LBA4 due to the WAB command 302 being buffered, and so reads the data at Buf3 as well as reading the block 406 from the storage device 308. A merge 408 is performed to overwrite part of the block 406 with the data from Buf3, and this is then returned 410 to the requestor. At this time, the merged block can be optionally written back to the storage device 308 by overwriting the entire block at LBA3. The entry in the WAB command 302 pertaining to LBA3 may also be removed.

The WAB command 208 can be implemented in various protocols e.g., the existing SCSI Write Buffer command with a specific buffer ID can be used for implementing this command. In such a case, a specific buffer ID or ID range can be used to specify the atomic write, and other IDs would be treated normally. The storage device firmware can specify in the capabilities field about the buffer IDs supported by the device. Similarly, this concept can be applied to other protocols like NVME, SATA etc.

In summary, the proposed systems and methods remove the need for journaling/logging for scattered metadata operations. Atomic support for writing multiple scattered writes (of non-sector size buffers), will help to improve metadata IOPs, improving filesystem performance. This approach avoids a direct call to read-modify-write for metadata updates which are smaller than granularity of sector. This helps to reduce extra read IOs in the system. Existing command interfaces can be used to provide this feature, with almost no changes or minimal changes to device initiator interface. Background processing of the WAB command will further help to improve latency associated with metadata operations. Simple device or drive firmware changes may be made to support this feature.

Figure 5:
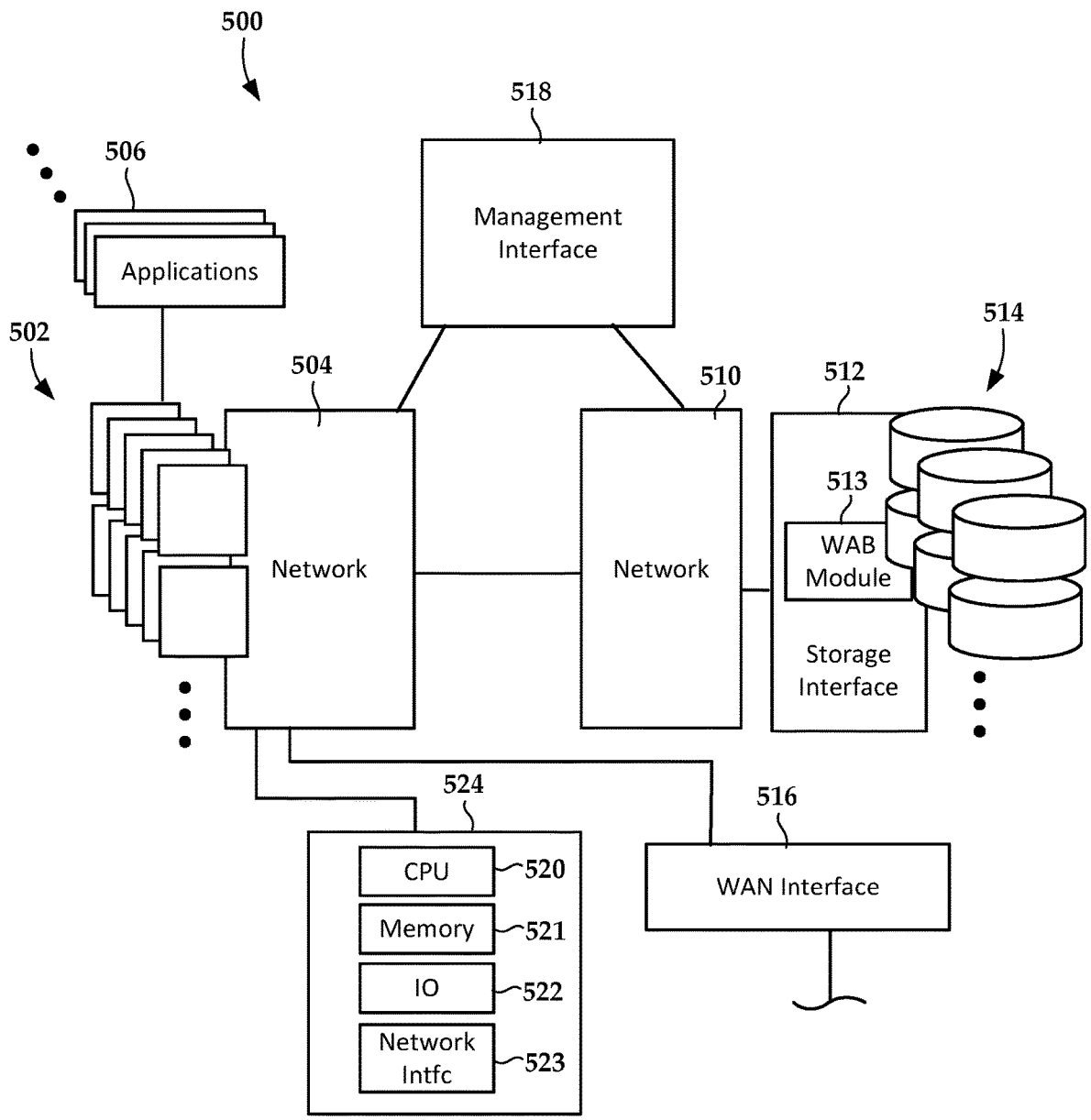
FIG. 5 is a block diagram of a system and apparatus according to an example embodiment.

In FIG. 5, a diagram illustrates hardware details of a system 500 according to an example embodiment. Any of the embodiments shown in FIGS. 1-4 can be implemented using a hardware arrangement as shown in FIG. 5. The system 500 is implemented using one or more computing nodes 502, which each generally includes computing hardware such as central processing units (CPUs), random access memory (RAM), graphics processing units (GPU), input-output (IO) hardware, etc. The computing nodes 502 are generally coupled to one or more network segments 504 that allow the compute nodes 502 to communicate with one another and with the rest of the software system 500.

The computing nodes 502 may include individual servers, or each may include a virtual machine, where multiple virtual machines run on a single host server. The computing nodes 502 may each include independently-operating software, e.g., kernels, operating systems, drivers, etc. Generally, the arrangement and configuration of the nodes 502 may be different depending on the high-level functions provided by the system 500, here represented as applications 506. For example, the system 500 may be configured as a general-purposes web service provider, offering such services as Web hosting, email hosting, e-commerce, relational database, etc. In other embodiments, the system 500 may provide a single service such as cloud storage, cloud compute, machine learning compute, paralleled supercomputing, etc.

The applications 506 are also referred to herein as user applications, in that an end-user relies on the applications 506 to perform specified tasks. While some user applications will involve user direct user interactions (e.g., web server, e-commerce) not all user applications will require direct user interface. Note that the term user application is not meant to imply only a single user process. For example, a user application may include cluster computing application, in which many thousands of individual processes work across the data center on a single task.

Generally, the applications 506 will use some level of persistent data storage. According to various embodiments, a network 510 is dedicated to storage, e.g., a storage area network (SAN). The storage network 510 is coupled to local storage interfaces 512 (e.g., controller cards) that ultimately send data in and out of distributed storage 514, e.g., hard disks, solid-state drives (SSDs), optical storage, tape storage, etc.

Also shown in FIG. 5, is a wide-area network (WAN) interface 516 that is accessible by the system 500. The WAN interface 516 may be coupled to the public Internet, and/or via non-public WANs. A management interface 518 is shown coupled to various components within the system 500. The management interface 518 may include software that runs dedicated hardware (e.g., management computers) as well as being distributed to other computing nodes and devices throughout the system 500. The management interface 518 may provide, among other things, interfaces that allow a person or a supervisor program manage aspects such as load balancing, thermal management, failure detection and remediation, etc.

The hardware used by the system 500 can vary widely, but generally includes conventional computing components as illustrated by example computing device 524. The device 524 includes a processor 520 (e.g., central processing unit, or CPU) that runs software instructions, and may also include embedded firmware. A memory 521 is coupled to the CPU 520 and may include any combination of volatile memory (e.g., random access memory, or RAM) and non-volatile memory (e.g., flash memory, magnetic storage). The CPU 520 communicates with the memory 521 and other peripherals via IO circuitry 522, which may include memory busses, peripheral busses, etc. An example of a peripheral device is shown as network interface 523, which facilitates communicating via the networks 504. Note that the system 500 need not be tied to a particular location and can use similarly configured hardware and software processes that are remotely located and accessible via WAN interface 516.

Figure 6:
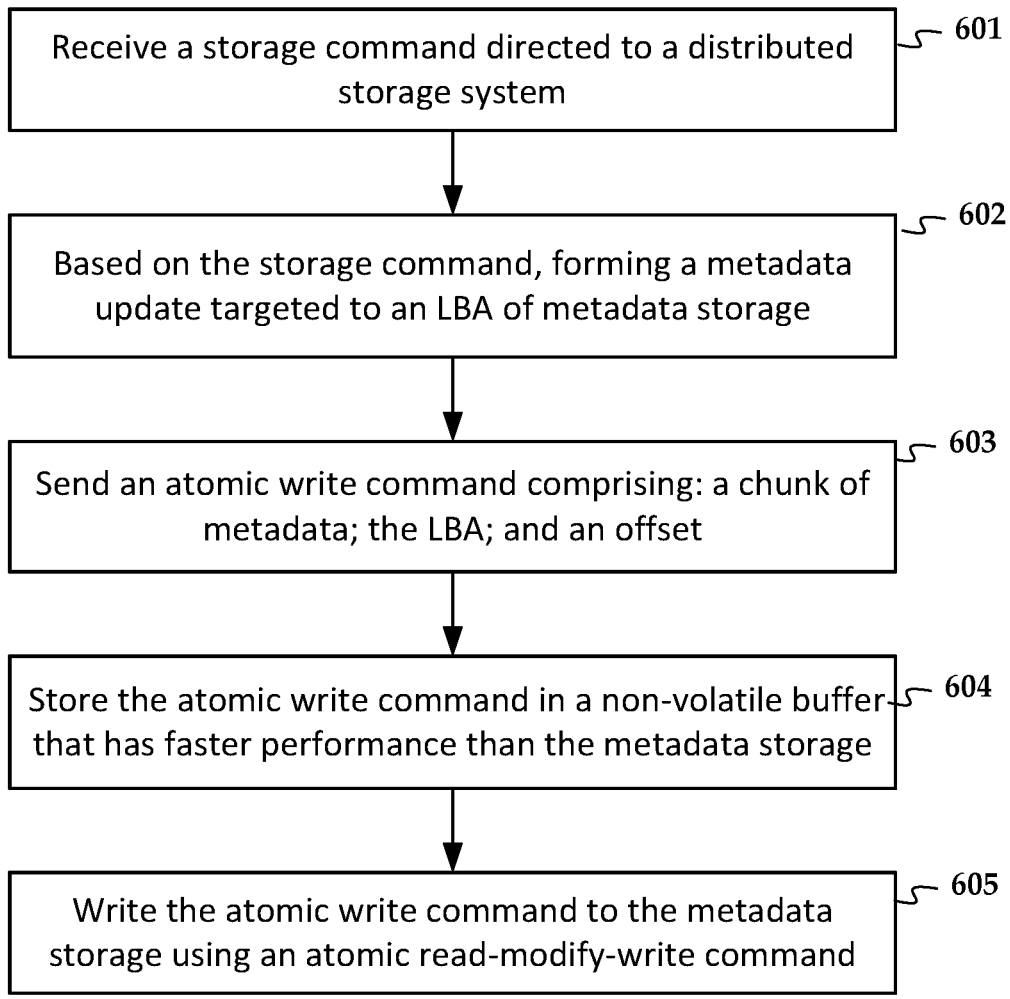
FIG. 6 is a flowchart of a method according to an example embodiment.

The local storage interfaces 512 includes a WAB module 513 that is configured to manage scattered metadata writes in the system 500. An example of method performed via the WAB module 513 is shown in the flowchart of FIG. 6. The method involves receiving 600, from a client computer (e.g., via applications 506), a write command directed to a distributed storage system 514. Based on the write command, a metadata update is formed 601 that targeted to a metadata storage of the distributed storage system 514, wherein the metadata update may include a chunk of metadata that is smaller than a block size of the metadata storage, although it may be equal to the block size in some cases. An atomic write command is sent 602 to a block device interface 512. The atomic write command includes the chunk of metadata; a logical block address of a block in the metadata storage; and an offset within the block defining where the chunk of metadata is to be stored. At the block device interface, the atomic write command is stored 603 in a non-volatile buffer that has faster performance than the metadata storage. The atomic write command is written 604 to the metadata storage via a background process using an atomic read-modify-write command.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   receiving a storage command directed to a distributed storage system;
   based on the storage command, forming a metadata update targeted to a logical block address of metadata storage of the distributed storage system, wherein the metadata update comprises a chunk of metadata that is smaller than a block addressed by the logical block address;
   sending, to a block device interface, an atomic write command comprising the chunk of metadata, the logical block address, and an offset within the block defining where the chunk of metadata is to be stored;
   via the block device interface, storing the atomic write command in a non-volatile buffer that has faster performance than the metadata storage; and
   writing the chunk of metadata of the atomic write command from the non-volatile buffer to the block in the metadata storage via a background process using an atomic read-modify-write command.

2. The method of claim 1, further comprising placing a lock on the logical block address after storing the atomic write command in the non-volatile buffer and before writing the chunk of metadata from the non-volatile buffer to the metadata storage.

3. The method of claim 2, further comprising:
   receiving a subsequent storage command directed to the distributed storage system;
   based on the subsequent storage command, forming a subsequent metadata update targeted to the logical block address, wherein the subsequent metadata update comprises a subsequent chunk of metadata;
   sending, to the block device interface, a subsequent atomic write command comprising the subsequent chunk of metadata, the logical block address, and a subsequent offset;
   via the block device interface, storing the subsequent atomic write command in the non-volatile buffer; and
   based on the lock, merging the subsequent chunk of metadata with the chunk of metadata before writing the subsequent chunk of metadata and the chunk of metadata together from the non-volatile buffer to the block in the metadata storage.

4. The method of claim 2, further comprising:
   before writing the atomic write command from the non-volatile buffer to the metadata storage, receiving a read command directed to the distributed storage system, the read command including the logical block address;
   based on the lock, reading the block from the metadata storage and merging the chunk of metadata with the block to form an updated block; and
   returning the updated block in response to the read command.

5. The method of claim 4, further comprising: writing the updated block to the metadata storage;
   removing the chunk of metadata, the logical block address, and the offset from the non-volatile buffer; and
   removing the lock.

6. The method of claim 1, wherein the atomic write command further comprises an error detection or correction value, the block device interface using the error detection or correction value to validate the chunk of metadata before storing the atomic write command in the non-volatile buffer.

7. The method of claim 6, wherein the error detection or correction value comprises a cyclic redundancy check or checksum.

8. The method of claim 1, wherein the storage command involves writing content that is targeted to a content storage of the distributed storage system, the metadata update associated with content, the content storage and the metadata storage using separate storage volumes.

9. The method of claim 1, wherein the metadata update is used to update a searchable data structure in volatile memory in addition to the atomic write command being sent to the block device interface.

10. An apparatus comprising a processor that reads instructions from a memory, the instructions causing the processor to perform the method of claim 1.

11. A method comprising:
receiving one or more storage commands directed to a distributed storage system;
based on the one or more storage commands, determining chunks of metadata in a metadata storage unit that are to be updated as part of the one or more storage commands, the chunks of metadata each being smaller than a block size of the metadata storage unit, the metadata storage unit separate from a content storage unit, and the chunks of metadata discontinuously scattered across the metadata storage unit;
sending, to a block device interface, an atomic write command comprising data that includes the chunks of metadata, respective logical block addresses and offsets associated with the chunks of metadata, the offsets defining where the chunks of metadata are to be stored in the respective logical block addresses;
via the block device interface, storing the data of the atomic write command in a non-volatile buffer that has faster performance than the metadata storage; and
writing the chunks of metadata of the atomic write command from the non-volatile buffer to respective blocks in metadata storage unit via a background process using atomic read-modify-write commands.

12. The method of claim 11, further comprising placing locks on the respective logical block addresses after storing the atomic write command in the non-volatile buffer and before writing the atomic write command from the non-volatile buffer to the metadata storage.

13. The method of claim 12, further comprising:
receiving a subsequent storage command directed to the distributed storage system;
based on the subsequent storage command, forming a subsequent metadata update targeted to a logical block address of the respective logical block addresses, wherein the subsequent metadata update comprises a subsequent chunk of metadata;
sending, to the block device interface, a subsequent atomic write command comprising the subsequent chunk of metadata, the logical block address, and a subsequent offset;
via the block device interface, storing the subsequent atomic write command in the non-volatile buffer; and
based on the locks, merging the subsequent chunk of metadata with one of the chunks of metadata associated with the logical block address before writing the subsequent chunk of metadata and the associated chunk of metadata together from the non-volatile buffer to the metadata storage.

14. The method of claim 12, further comprising:
before writing the atomic write command from the non-volatile buffer to the metadata storage, receiving a read command directed to the distributed storage system, the read command including a logical block address of the respective logical block addresses; and
based on the locks:
determining a chunk of metadata associated with the logical block address from the chunks of metadata;
reading a block addressed by the logical block address from the metadata storage; and
merging the chunk of metadata with the block to form an updated block; and
returning the updated block in response to the read command.

15. The method of claim 14, further comprising: writing the updated block to the metadata storage;
removing the chunk of metadata and the logical block address from the non-volatile buffer; and
removing one of the locks affecting the logical block address.

16. The method of claim 11, wherein the atomic write command further comprises error detection or correction values, the block device interface using the error detection or correction values to validate the chunks of metadata before storing the atomic write command in the non-volatile buffer.

17. The method of claim 16, wherein the error detection or correction values comprise cyclic redundancy checks or checksums.

18. The method of claim 11, wherein the one or more storage commands involves writing content that is targeted to the content storage unit, the chunks of metadata associated with the content.

19. The method of claim 11, wherein the chunks of metadata are used to update a searchable data structure in volatile memory in addition to the atomic write command being sent to the block device interface.

20. An apparatus comprising a processor that reads instructions from a memory, the instructions causing the processor to perform the method of claim 11.

* * * * *